(12) United States Patent
Calloway

(10) Patent No.: US 7,266,841 B2
(45) Date of Patent: Sep. 4, 2007

(54) SECURITY AND COMMUNICATIONS MODULE

(75) Inventor: Jamey O. Calloway, Archdale, NC (US)

(73) Assignee: Tyco Electronics Corporation, Middletown, PA (US)

( * ) Notice: Subject to any disclaimer, the term of this patent is extended or adjusted under 35 U.S.C. 154(b) by 1352 days.

(21) Appl. No.: 09/747,671

(22) Filed: Dec. 22, 2000

(65) Prior Publication Data

US 2002/0083338 A1 Jun. 27, 2002

(51) Int. Cl.
*G06F 9/00* (2006.01)

(52) U.S. Cl. .............................. 726/13; 726/11; 726/3

(58) Field of Classification Search ................ 713/200, 713/201; 379/399, 93.08; 370/359; 726/3–6, 726/13, 7, 11
See application file for complete search history.

(56) References Cited

U.S. PATENT DOCUMENTS

| | | | | |
|---|---|---|---|---|
| 4,685,124 A | * | 8/1987 | Smitt et al. | 379/93.04 |
| 4,733,320 A | * | 3/1988 | Ikeuchi et al. | 361/67 |
| 5,051,982 A | * | 9/1991 | Brown et al. | 370/381 |
| 5,187,705 A | * | 2/1993 | Mano | 370/244 |
| 5,418,842 A | * | 5/1995 | Cooper | 379/93.33 |
| 5,577,115 A | * | 11/1996 | Deutsch et al. | 370/359 |
| 5,668,857 A | | 9/1997 | McHale | 379/93.07 |
| 5,781,617 A | | 7/1998 | McHale et al. | 379/93.14 |
| 5,930,340 A | * | 7/1999 | Bell | 379/93.08 |
| 6,101,216 A | | 8/2000 | Henderson et al. | 375/222 |
| 2002/0083338 A1 | * | 6/2002 | Calloway | 713/201 |

FOREIGN PATENT DOCUMENTS

| | | |
|---|---|---|
| WO | WO99/20022 | 4/1999 |
| WO | WO99/34339 | 7/1999 |
| WO | WO99/51019 | 10/1999 |

OTHER PUBLICATIONS

"DSL Tutorial", Dec. 19, 1999, [Retrieved from Internet Jul. 22, 2004], "http://www.amgu.net/HTML/tutorial.htmUS".*
Secure speech communication over public switched telephone network Anas, N.M.; Rahman, Z.; Shafii, A.; Rahman, M.N.A.; Amin, Z.A.M.; Applied Electromagnetics, 2005. APACE 2005. Asia-Pacific Conference on Dec. 20-21, 2005 Page(s):4 pp.*
VoIP services with embedded CAC over cable modem systems Bih-Hwang Lee; Jhih-Ming Chen; Consumer Electronics, IEEE Transactions on vol. 51, Issue 3, Aug. 2005 pp. 815-823.*
DS-CDMA downlink system capacity enhancement through interference suppression Wang, Y.-P.E.; Bottomley, G.E.; Wireless Communications, IEEE Transactions on vol. 5, Issue 7, Jul. 2006 pp. 1767-1774.*
International Search Report, Applicant's or agent's file reference 17587 International application No. PCT/US 01/49963, International filing date Dec. 21, 2001.

* cited by examiner

*Primary Examiner*—David Jung

(57) ABSTRACT

The invention provides a module for use in a central service provider interface having access to security system and voice and data communications. The module is configured to allow the security system to seize the telephone line when necessary to indicate a security breached to the service provider by incorporating RJ31 functionality to allow the security panel to seize the primary line if activated. The module is also configured to connect a modem to an Internet service provider over PSTN twisted pair cable. Primary and secondary telephone lines are passed through the modem before the telephones to allow filtering of the data signals.

17 Claims, 2 Drawing Sheets

SECURITY AND COMMUNICATIONS MODULE

FIELD OF THE INVENTION

This invention is related to electronic devices and more particularly to an electronic module interface for connecting data and security services to the premises.

BACKGROUND

With the advent of high-speed data communications comes ever-increasing communication capabilities and reduced costs. Due to the reduction in cost, more and more high-speed communication systems are being installed at subscriber premises. These high-speed communication systems include high-speed modems which utilize the public switched telephone network (PTSN), cable modem systems, digital subscriber line (DSL), T1 line, ISDN and many others. Some of the systems share the PSTN with other voice communications. In these instances, at each end of a given communication path, components are necessary to separate the voice communications from the data communications being sent over a single PSTN line.

Some examples of such an arrangement are disclosed by related U.S. Pat. No. 5,668,857 and 5,781,617. These patents show a communications system having a number of subscribers coupled to a central office using twisted pair subscriber lines. The central office has a telephone switch that provides telephone services to the subscribers, and a communications server having a plurality of DSL modems to provide data service to the subscribers. At both the central office and the subscriber premises, a splitter is required to separate the voice communication from the data communication. The splitter serves to couple voice signals to a twisted pair phone line and data signals to a twisted pair data line. A DSL modem is connected to the twisted pair data line at each end and a telephone is connected to the twisted pair phone line at the subscriber premises.

A problem exists with such systems in that the separate splitter is required at the subscriber premises for separating the data and voice signals. Additionally, is often desirable to incorporate such data and voice services into a structured wiring system. Such structured wiring systems are becoming more prevalent in homes and include a central service provider interface which receives services from multiple providers and a structured wiring system for distributing these multiple services to various locations/rooms within the home. For example, the central service provider interface may be configured to receive cable television services and integrated data services over RG6 coaxial cable, telephone, fax, or data services over PSTN twisted pair cable, television, audio, and integrated data services from direct satellite links over coaxial cable from a satellite dish receiver. These are just some examples of the services which are typically received into the central service provider interface. The central service provider interface may also serve as a distribution point for a local area network, wide area network, internally sourced video or audio signals. A security system for the premises including multiple sensors and electronics for signaling a breach of security over the PSTN may also be incorporated into the central service provider interface. Such a security system requires access to the telephone lines or voice portion of the PSTN for contacting the service provider when security has been breached. A further problem exists in that when the security system accesses the telephone line as necessary for signaling a breach, it may undesirably interfere with data communications being provided over the same PSTN line. Since many services and connections are provided at the central service provider interface, it is desirable to minimize the number of components necessary for such interface.

SUMMARY

It is therefore object of the present invention to provide a module for use in a central service provider interface having access to security system and voice and data communications. The module has an input, a modem output, a modem input, a security interface, and a premise output. The input receives a plurality of communication lines containing a plurality of services. The modem output and input pass selected ones of the communication lines to a modem. The security interface passes selected communication line to a security system and for receiving the selected communication line from the security system and the output is connected to premise outlets.

The module is configured to allow the security system to seize the telephone line when necessary to indicate a security breach to the service provider by incorporating RJ31 functionality to allow the security panel to seize the primary line if activated. The primary and any other telephone/voice lines are passed through the modem before the telephones to allow filtering of the data signals.

BRIEF DESCRIPTION OF THE DRAWINGS

The invention will now be described by way of example with reference to the accompanying figures of which.

DETAILED DESCRIPTION OF THE PREFERRED EMBODIMENT

Figure 1:
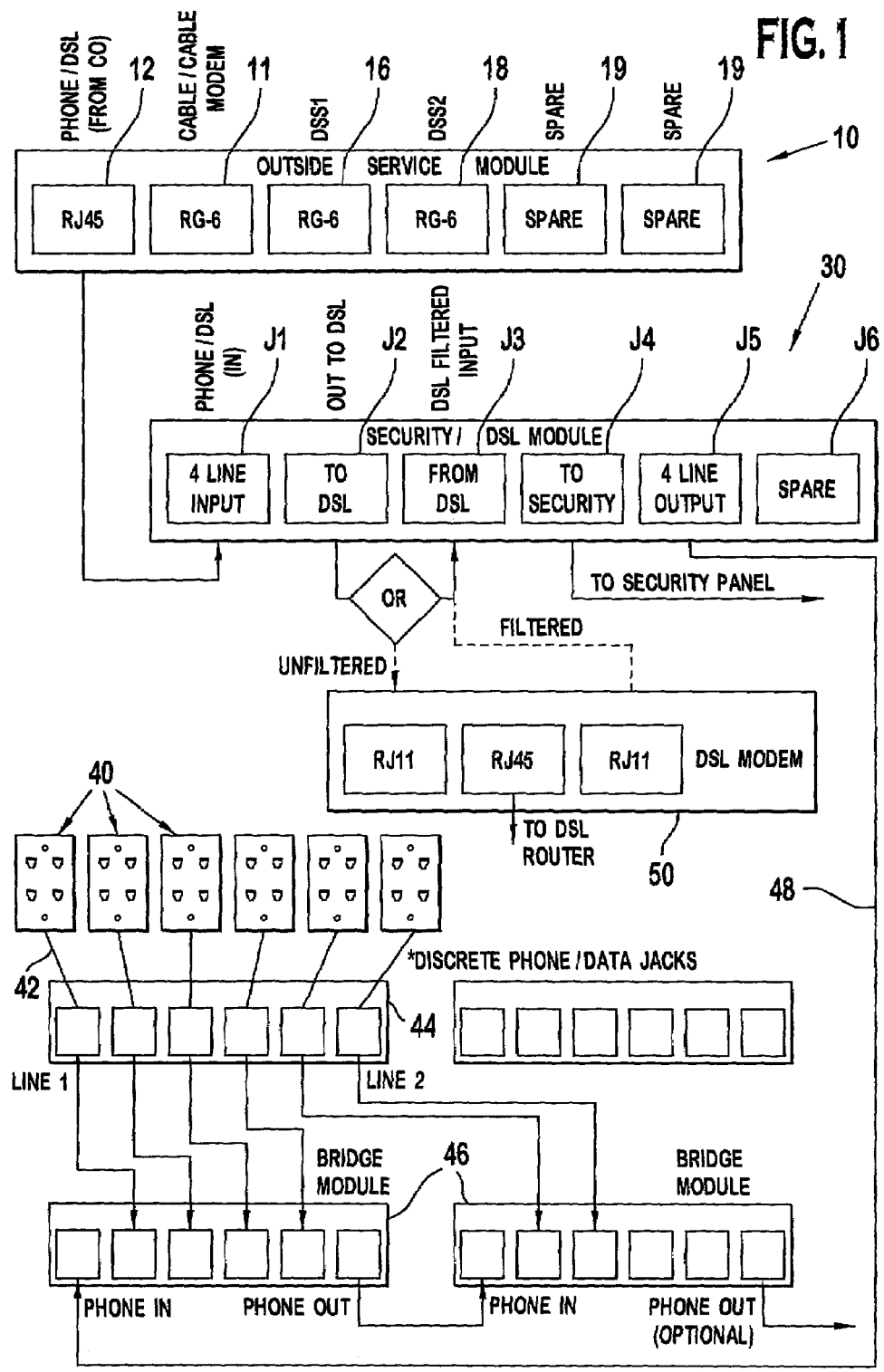
FIG. 1 is a block diagram of a modular portion of a typical central service provider interface

Referring first to FIG. 1, a structured wiring system containing the security and communications module of the present invention will be described in general. This system includes an outside service module 10, a communications module 30, a modem 50, a plurality of outlets 40, datajacks 44, and bridge modules 46. These major components are connected to each other through a structured wiring network. The wiring network may comprise twisted pair cable such as category 5 cable, coaxial cable, or fiberoptic transmission media. The preferred cabling network is formed of category 5 or category 6 twisted pair cable but may also include other industry standard twisted pair cable. Interconnections at each module are preferably modular jack connectors. Services such as telephone, cable TV, cable modem, or digital satellite services (DSS) enter the premises at the outside service module 10. Each of the services is distributed to the outlets 40 through the cabling network. In the case of telephone and data communications, the service is received through the outside service module 10 and then passes through the communications module 30 where the data communications are passed to the modem 50 and the voice communications are passed through bridge modules 46 and data jacks 44 to outlets 40.

Each of the major components will now be described in greater detail with reference to FIGS. 1 and 2. First, the outside service module 10 consists of a plurality of inputs (not shown) each for receiving a respective service. A plurality of outputs 12, 14, 16, 18, 19 are provided for distributing each service. The outside service module 10 is located within a customer premises at a service entrance and contains suitable electrical connectors for each of the outputs 12, 14, 16, 18, 19. In the preferred embodiment, the voice/data output 12 is an RJ45 connector, while the cable TV and cable modem output 14, and DSS outputs 16, 18 are F-type RG-6 cable connectors.

The communications module 30 contains a four line input J1 which is preferably an RJ45 connector for receiving the voice/data from the outside service module 10. A modem output J2 is preferably an RJ45 connector. Input from the modem is received at J3, which is also preferably an RJ45 connector. Alternatively, RJ14 or other suitable connectors may be utilized for J2 or J3. When a modem 50 is not connected a jumper is connected between J2 and J3 therefore allowing communications signals to pass directly from J2 to J3 Alternatively, a switching connector can be utilized at J2. This alternative switching connector is configured to have an open switch between J2 and J3 when a modem is connected and a closed switch when the modem is disconnected. An output to the security system is provided at J4, which is preferably an RJ45 connector. Four line output J5 and a spare output J6 are also preferably RJ45 connectors. It should be understood that while the preferred embodiment utilizes RJ connectors, other suitable electrical connectors may be used for the communications module 30.

Figure 2:
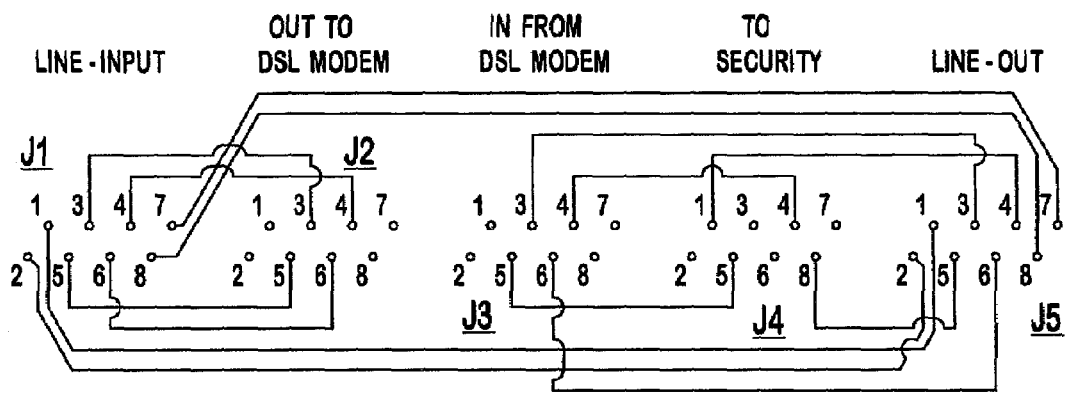
FIG. 2 is a schematic representation of the security and communications module according to the current invention
Figure 3:
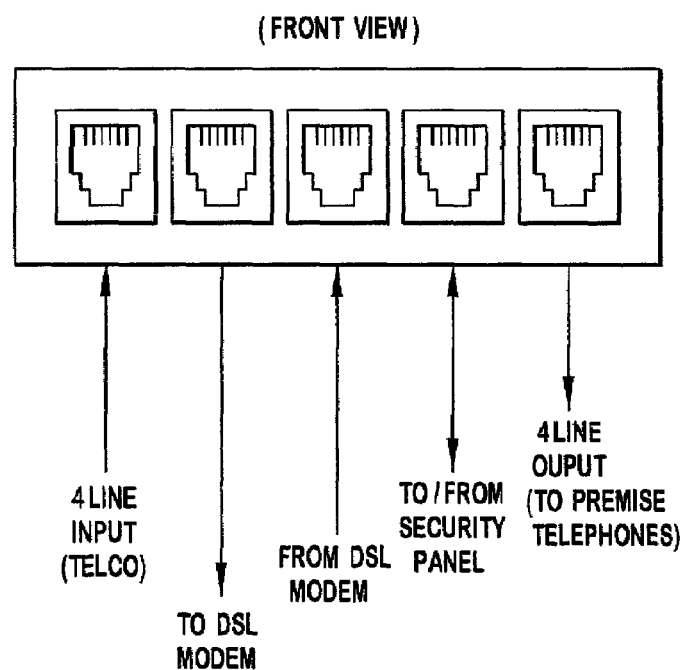
FIG. 3 is a front view of the receptacles of the security and communications module FIG. 2.

Referring now to FIGS. 2 and 3, the communications module 30 will be described in greater detail. FIG. 2 shows the connections between each of the connectors in schematic form and FIG. 3 shows the connectors on the front face of the communications module 30. Each output connector J1-J5 has eight pins for connecting four twisted pair lines. According to industry standards, line 1 is connected to pins 4 and 5, line 2 is connected to pins 3 and 6, line 3 is connected to pins 1 and 2 and line 4 is connected to pins 7 and 8. Pins 1, 2, 7 and 8 feed lines 3 and 4 directly from J1 to corresponding pins on J5. Lines 3 and 4 are therefore fed directly from the outside service module 10 to the bridge module 46 over line 48.

Pins 4 and 5 (line 1) of J1 are connected to pins 4 and 5 of J2 for output to the modem 50. After passing through the modem 50, line 1 is returned to the communications module 30 at pins 4 and 5 of J3. If the modem 50 is removed from the system, line 1 is passed directly from J2 to J3. This can be accomplished by either utilizing a switching receptacle connector such as an RJ11 which is configured to close a switch between J2 and J3 when the plug connected to the modem 50 is removed from J2 or may be alternatively accomplished utilizing a jumper between J2 and J3 when the modem 50 is removed. Pins and 4 and 5 of J3 are connected to pins 4 and 5 of J4 to feed line 1 to a security system. Line 1 is returned to J4 at pins 1 and 8 from the security system. Pins 1 and 8 of J4 are then connected to pins 4 and 5 of J5 for output to line 48.

Pins 3 and 6 (line 2) of J1 are connected to pins 3 and 6 of J2 for output to the modem 50. After passing through the modem 50, line 2 is returned to the communications module 30 at pins 3 and 6 of J3. Similarly, if the modem is removed from the system, line 2 is passed directly from J2 to J3. This can be accomplished by either utilizing a switching receptacle connector such as an RJ11 which is configured to close a switch between J2 and J3 when the plug connected to the modem 50 is removed from J2 or may be alternatively accomplished utilizing a jumper between J2 and J3 when the modem 50 is removed. Pins 3 and 6 of J3 are connected to pins 3 and 6 of J5 to bypass the security system and output line 2 directly to line 48.

Returning to FIG. 1, the modem 50 is connected to J2 and J3 of the communications module 30. This modem is preferably a DSL modem however, it should be understood that other protocol modems may be utilized. The preferred DSL modem 50 has a built-in filter that eliminates the high frequency data component from the voice band. This filter eliminates the high frequency data component from the communications signals entering communications module at J3. Alternatively, a filter could be connected in line with the modem to filter the high frequency data component from J3.

A bridge module 46 receives input from J5 and subsequent bridge modules 46 are cascaded from the one connected to J5. Data jacks 44 are connected to respective outputs of the bridge modules 46. These data jacks 44 connect outlets 40 located throughout the premises to the bridge modules 46. Each outlet 40 is capable of receiving either data communications, voice communications, or both. Bridge modules 46 can be cascade as shown in FIG. 1 by connecting an output of one bridge modules 46 to the input of an adjacent bridge module 46.

In operation, the communications module 30 allows for data communications on lines 1 and 2 while simultaneously passing voice communications on lines 1-4. Output to a security system is provided to allow notification of a security breach to the monitoring service over line 1. The communications module is configured to pass lines 3 and 4 directly from the input at J1 to the output at J5. Lines 1 and 2 pass from the input at J1 through the modem 50 where the voice and data communications are separated and filtered. Line 1 is returned from the modem 50 and then passed through the security system (J4) to the output at J5 while line 2 is passed directly from the modem 50 to the output at J5. The module 30 incorporates RJ31 capability to allow the security system to seize line 1 if the security breach is detected. Upon seizure of line 1, the security system dials out to a monitoring service to send notification of the breach. Although line 1 is seized by the security system, data communications through the modem 50 are not interrupted. Line 1 is only disconnected from J5 (line output) while remaining connected to J2 and J3 (modem) upon line seizure. This allows data communications to flow while interrupting voice communications over line 1 to the outlets 40.

An advantage of the present invention is that it allows for a structured wiring system connection to the modem for data communications and a security system for monitoring purposes. The module is configured to connect a modem to an Internet service provider over PSTN twisted pair cable. Primary and secondary telephone lines are passed through the modem before the telephones to allow filtering of the data signals.

This is accomplished without the need for a separate splitter, which is otherwise required to separate the voice and data communications.

I claim:

1. A communications module for use in a premise wiring system comprising:
    an input for receiving a communication line containing data and voice communication services;
    a modem output for passing the voice and data services to a modem;
    a modem input for receiving only the voice service from the modem; and,
    a premise output for receiving only the voice service from the modem input.

2. The communications module of claim 1 further comprising a security interface connected between the modem input and the premise output for passing the voice service to a security system and for receiving the voice service from the security system.

3. The communications module of claim 1 wherein the modem filters the voice service from the data service.

4. The communications module of claim 2 wherein the security system is configured to seize the voice service upon detection of a breach.

5. The communications module of claim 4 wherein data service to the modem is uninterrupted by seizure of the voice service by the security system.

6. A communications module for use in a premise wiring system comprising:
- an input for receiving a plurality of communication lines containing a plurality of services;
- a modem output for passing selected ones of the communication lines to a modem;
- a modem input for receiving the selected ones of the communication lines from the modem;
- a security interface for passing a selected communication line to a security system and for receiving the selected communication line from the security system; and,
- a premise output for receiving the selected ones of the communications lines from the modem and the selected communication from the security system.

7. The communications module of claim 6 wherein the plurality of communication lines comprises four twisted pair lines bundled in a cable.

8. The communications module of claim 6 wherein the modem output is configured to pass the selected ones of the communication lines to a connected modem and configured to pass the selected ones of the communication lines directly to the modem input when the modem is disconnected.

9. The communications module of claim 8 wherein the modem output further comprises an RJ45 connector.

10. The communications module of claim 6 wherein the security interface is configured to interrupt a voice communications on the selected line for exclusive use by the security system when a breach is detected.

11. The communications module of claim 10 wherein the security interface and modem allow data communications to pass when the selected line is interrupted.

12. A communications module for use in a premise wiring system comprising:
- input means for receiving a plurality of services;
- output means for passing the plurality of services to outlets in the premise wiring system;
- filter interface means connected between the input means and output means for passing selected services to a filter; and,
- security system interface means connected between the filter interface means and the output means for passing selected voice service to a security system.

13. The communications module of claim 12 wherein the filter interface means passes data communications through a connected modem and passes voice communications to the security system interface means and output means.

14. The communications module of claim 13 wherein the filter interface means passes all communications directly to the security system means and output means when the modem is disconnected.

15. The communications module of claim 12 wherein the security system interface means interrupts voice communications to the output means when a security breach is detected.

16. The communications module of claim 15 wherein the security system interface allows data communication to pass to the output means when a security breach is detected.

17. A process of distributing voice and data signals in a premises wiring system, comprising the steps of:
- receiving combined voice and data signals in a module;
- filtering the voice and data signals to separate the voice signals from the data signals wherein the step of filtering comprises sending the combined voice and data signals from the module to a modem and sending only the voice signals from the modem back to the module; and
- distributing the filtered voice signals from the module.

* * * * *